Figure 1:
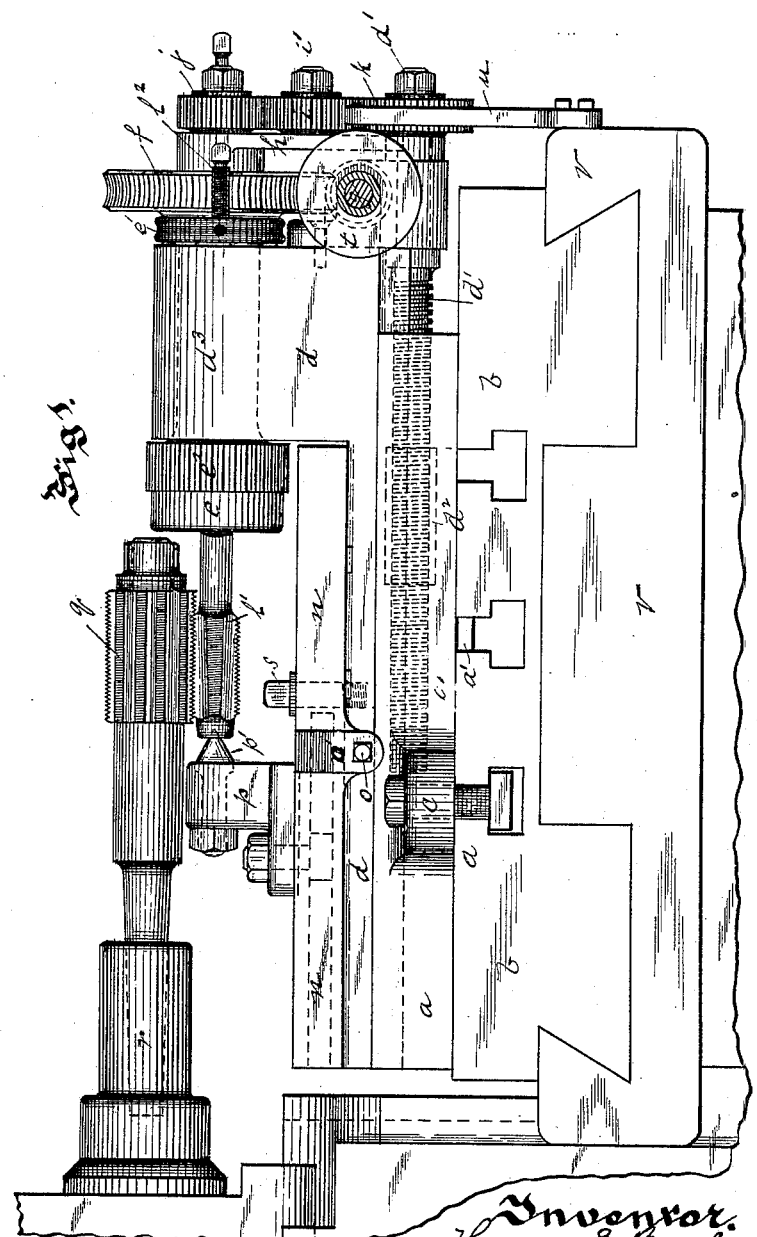

(No Model.)  3 Sheets—Sheet 1.

H. E. BOYD.
MACHINE FOR CUTTING TAPS.

No. 392,582. Patented Nov. 13, 1888.

(No Model.) 3 Sheets—Sheet 2.

H. E. BOYD.
MACHINE FOR CUTTING TAPS.

No. 392,582. Patented Nov. 13, 1888.

Witnesses:
J. N. Cooke
N. S. Stockwell

Inventor,
Henry E. Boyd.
By James F. Kay,
Attorney.

(No Model.) 3 Sheets—Sheet 3.

H. E. BOYD.
MACHINE FOR CUTTING TAPS.

No. 392,582. Patented Nov. 13, 1888.

Witnesses:
J. H. Cooke
N. S. Stockwell

Inventor.
Henry E. Boyd.
By James H. Kay,
Attorney.

UNITED STATES PATENT OFFICE.

HENRY E. BOYD, OF McKEESPORT, PENNSYLVANIA.

MACHINE FOR CUTTING TAPS.

SPECIFICATION forming part of Letters Patent No. 392,582, dated November 13, 1888.

Application filed January 10, 1888. Serial No. 260,311. (No model.)

*To all whom it may concern:*

Be it known that I, HENRY E. BOYD, of McKeesport, in the county of Allegheny and State of Pennsylvania, have invented a new and useful Improvement in Machines for Cutting Taps; and I do hereby declare the following to be a full, clear, and exact description thereof.

My invention relates to the manufacture of taps, and more especially to an apparatus for cutting the threads on the same.

Heretofore in the manufacture of taps the threads on the tap-blanks were formed on one blank at a time either by a die or by a milling-cutter, cutting one thread as the tap-blank rotated in a lathe-spindle. This operation was necessarily slow, and when a series of taps were made they were not absolutely uniform, as each tap had its threads formed by separate operations.

The object of my invention is to provide an attachment for an ordinary milling-machine by which all the threads of each face of a series of tap-blanks can be cut at one operation, or the threads of each face of a single tap-blank can be cut at one operation, these threads being either straight, curved, or relieved, as may be desired.

To these ends my invention consists, generally stated, in combining with a rotary cutter having circumferential milling-grooves thereon corresponding to the threads to be formed on the tap a slide moving transversely under said rotary cutter and having thereon a spindle and tail-stock which are adjustable with relation to each other, so as to hold the tap-blank sufficiently out of parallel with the cutter to enable it to impart the pitch to the threads formed on the tap, so that by holding the tap-blank at a very slight angle to the rotary cutter I am enabled at one feeding of the tap to the cutter to mill all the threads on one face of the tap.

It also consists in means for moving longitudinally the plate carrying the tap-blank according to the pitch of the threads to be formed, so as to feed each face thereof in proper position for the threads to be milled thereon.

It also consists in means for forming the relief on the threads of the tap; and the invention also consists in certain other improvements, all of which will be more fully hereinafter set forth.

To enable others skilled in the art to make and use my invention, I will describe the same more fully, referring to the accompanying drawings, in which—

Figure 2:
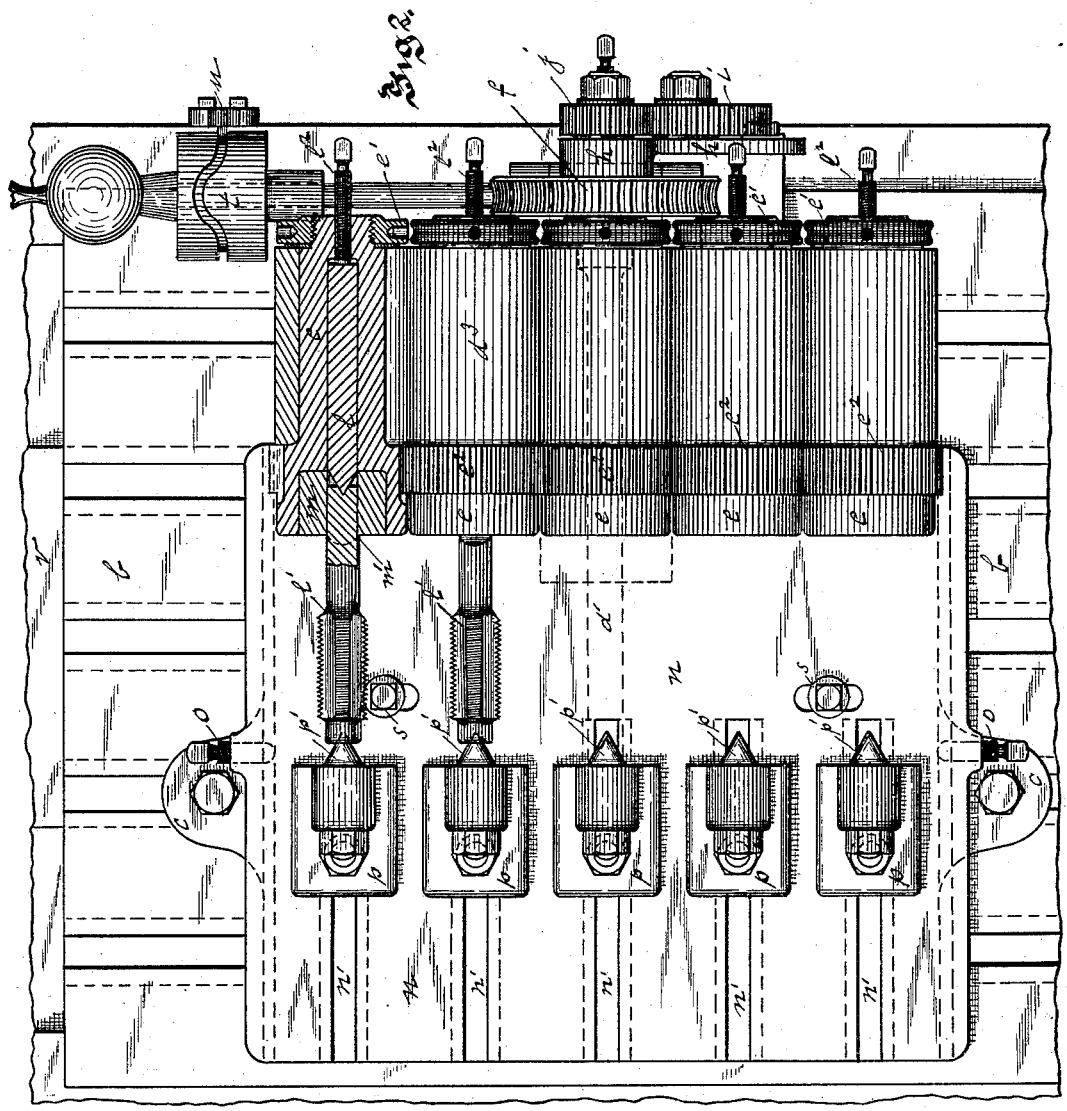
Figure 3:
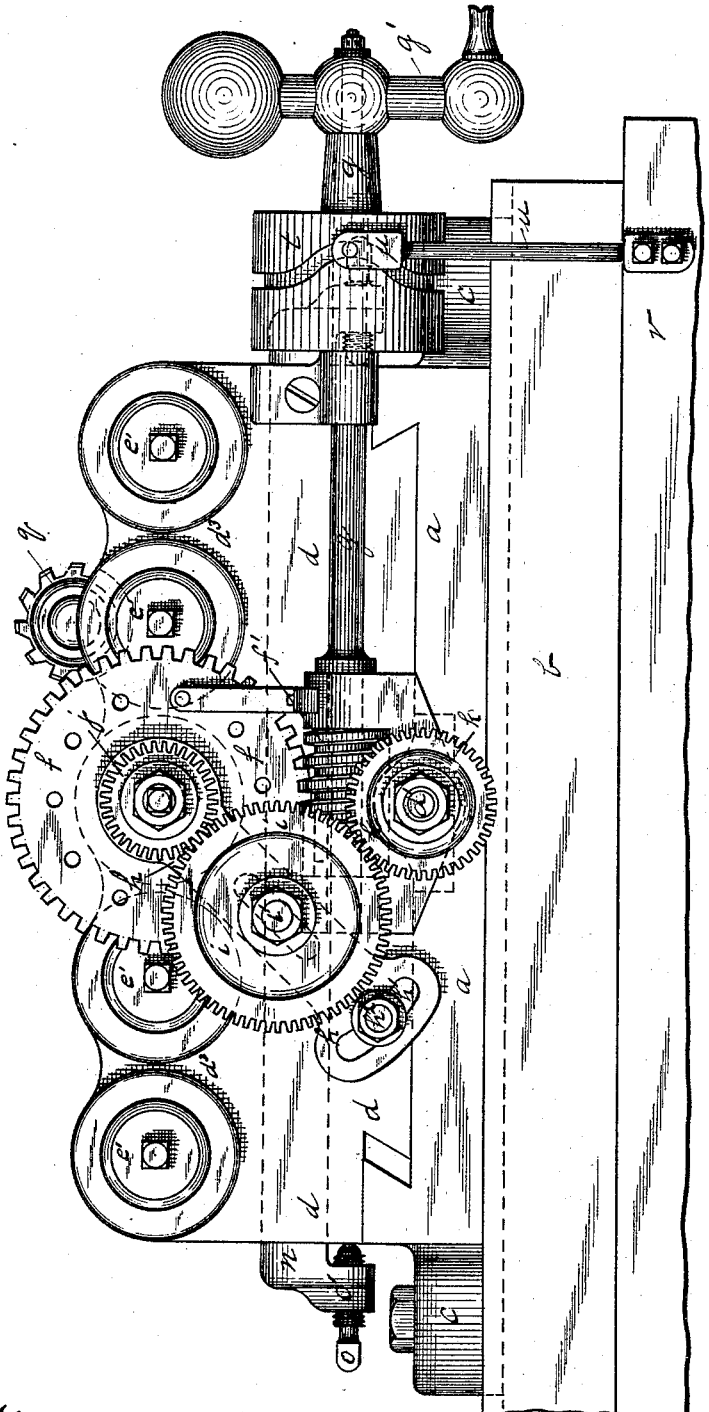

Figure 1 is a side view of my improved attachment in position on a milling-machine, the latter being only partly shown. Fig. 2 is a plan view of the attachment, partly in section. Fig. 3 is an end view of the same.

Like letters refer to like parts in each of the figures of the drawings.

My improved tap-milling device is designed as an attachment to be placed upon the bed of and used with an ordinary milling-machine and will be described in connection therewith, though the apparatus may of course be built up as a separate machine or to be connected to other machines. The base block or plate $a$ of the attachment is provided with a rib, $a'$, on its under side, which fits in one of the grooves of the platen $b$ of the milling-machine, and on each side of the plate there is an ear or ears, $c$, through which clamping-bolts pass that secure the block or plate $a$ to the platen $b$. This permits the block $a$ and the attachment carried by it to be placed at any point on the reciprocating platen $b$ and be securely fastened thereto. Resting on the block or plate $a$ is a slide, $d$, which has a dovetailed connection therewith and has a uniform movement across said plate imparted to it by a screw-shaft, $d'$, which is journaled on the under side of the slide, and engages a nut, $d^2$, on the block $a$, the shaft $d'$ receiving its rotation from the mechanism hereinafter described. This slide $d$ is provided with an upright portion or head, $d^3$, at its outer end, in which are journaled a series of horizontal hollow spindles, $e$, which are held in their bearings by jam-nuts $e'$ at their outer ends or by other suitable means, each spindle having formed on or secured to its inner end a pinion, $e^2$, the pinions meshing with each other, so that all of the spindles will rotate simultaneously.

One of the series of spindles $e$, preferably the middle, has keyed or otherwise secured thereto a worm-wheel, $f$, that meshes with a worm, $f'$, on a shaft, $g$, which is journaled in bearings attached to the end of the slide $d$, this shaft $g$ having a crank-arm, $g'$, on its outer end for convenience in operating. The middle spindle also has pivoted thereto outside of the worm-wheel $f$ an arm, $h$, which carries an intermediate pinion, $i$, that meshes with a pinion, $j$, which is keyed or otherwise removably secured to the outer end of the middle spindle, and also meshes with a pinion, $k$, on the screw-shaft $d'$, heretofore described. In order to provide for change in the ratio of speed of rotation of the shaft $d'$ with respect to that of the spindles, the pinions $j$ and $k$ are removable, so that others of different diameters may be substituted therefor, the arm $h$ carrying the intermediate pinion, $i$, and the latter on the arm itself being adjustable to bring this pinion $i$ into gear with the pinions $j$ and $k$ when others of different diameters are substituted therefor. To accomplish this, the stud $i'$, on which the pinion $i$ is mounted, is held in a longitudinal slot in the arm, so that the pinion may be adjusted radially, and at the same time, to provide for unequal diameters of the pinions $j$ and $k$, the outer end of the arm $h$ has a segmental slot, $h'$, through which passes a clamping-bolt, $h^2$, that secures the arm to the slide $d$. By this arrangement the spindles $e$ and screw-shaft $d'$ can be rotated in a different ratio of speed with respect to each other by the crank-shaft $g'$, which ratio can be varied by changing the pinions $j$ and $k$ or only one of them to others of larger or smaller diameter and adjusting the arm $h$ so that the intermediate pinion is in gearing with said pinions $j$ and $k$, as above set forth. As this screw-shaft $d'$ imparts a lateral movement to the slide $d$ with respect to the block $a$, attached to the reciprocating platen $b$, it will be seen that the spindles $e$ can be given a rotation and longitudinal movement with respect to the milling-cutter, which can be varied for the purpose, which will more fully hereinafter appear.

Within each hollow spindle $e$ is a centering-pin, $l$, which bears against the end of the tap-blank when the latter is revolved in the spindle, a set-screw, $l^2$, passing through the outer end of the spindle to press this pin tightly against the tap-blank, and in the inner end of each spindle is inserted a tight-fitting bushing, $m$, which is provided with a rectangular outwardly-tapering hole, $m'$, for the reception of the square shank of the tap-blank and permits a slight amount of divergence of the latter, for the purpose hereinafter described.

Supported on the slide $d$, and having a tongue-and-groove connection therewith, is a plate, $n$, which is adjusted across the slide $d$ by set-screws $o$, passing through lugs $o'$ on the sides of the plate and bearing against the edges of the slide $d$. This plate $n$ carries a series of tail-stocks, $p$, which slide in slots $n'$ in the plate and are secured thereto by suitable jam-nuts, each tail-stock carrying a center, $p'$, between which and the pin $l$ in the spindle the tap-blank $l'$ is securely held against longitudinal movement. As this plate $n$ is adjustable across the slide $d$ by the set-screws $o$, as heretofore described, the centers $p'$ can be so adjusted as to hold the tap-blank at a slight angle to the axial line of the spindle, and thus secure the necessary pitch to the threads cut on the tap-blank. The milling-cutter $q$ employed is one having a series of cutting-edges arranged to cut the threads of the proper pitch and is of a width sufficient to cut all the threads of the tap at once. This cutter is secured to the usual revolving spindle, $r$, of any ordinary milling-machine, such as are generally employed in machine-shops.

In employing this attachment for cutting threads on taps a tap-blank is inserted in each spindle with its square shank resting in the bushings $m$. The tail-stocks $p$ are then brought up until the centers $p'$ rest against the end of the tap-blank. The plate $n$ is now moved sidewise to secure the proper amount of inclination to the threads of the tap by inclining the axial line of the tap-blank to that of the milling-cutter and secured in this position by suitable clamping-bolts, $s$, and then the set-screws $l^2$ are screwed up until the tap-blank is tightly held between the pin $l$ and the centers $p'$. The tap-blanks are so placed in this operation that the face presented to the cutter is in true alignment therewith. The blanks being in position and the bed of the reciprocating platen of the milling-machine raised so that the milling-cutter is in position to operate, the mechanism for reciprocating the platen is thrown into gear and the tap-blanks are carried across the face of the rotating milling-cutter, which causes all the threads on that face of the tap-blank to be formed and on all of the series of taps held by the spindles. If a clearance to the threads is desired, the face of the tap to be cut is turned so that the rear edge of the face will be as much above the other edge of the face as the amount of clearance desired, when the blank is moved under the cutter as before. When all the tap-blanks have had the threads cut on the upturned face, the milling-cutter is raised or the platen lowered to allow the platen and its attachment to move back to its initial position, when the crank-arm of the shaft $g$ is turned sufficiently to bring the next face of the tap blank or blanks into position, this movement of the crank-shaft also turning the feed-shaft $d'$ a sufficient amount to move the slide $d$ and the tap-blanks longitudinally the necessary distance to give the required pitch to the threads; or, if it is desired to avoid moving the milling-cutter upward, the tap-blanks may be turned by the crank-shaft one-half the arc necessary to bring the next face in opposition to the cutter—that is, so as to bring the groove of the tap-blank opposite the cutter, which would allow the blank to pass under the cutter by the backward movement of the platen without affecting the same. If desired, an index plate and finger may be placed upon the crank-shaft or on one of the spindles to indicate and regulate the extent of the turning of the spindles and the movement of the slide on the platen. The forms of tap cut by this operation are such as are used for tapping continually forward, as for nuts and couplings. In cutting fine machinist taps, when clearance is required, the blank is set so that its center is slightly to the left of the center of the milling-cutter and the blank revolved by the spindle under the rotating cutter, the platen being stationary. This causes the formation of the necessary clearance and the spirality of the threads. As fast as one blank is cut the next is brought into position under the cutter by moving the platen. In order to back off the threads while being cut a cam, $t$, is placed on the crank-shaft, which cam is engaged by an arm, $u$, attached to the stationary bed $v$ of the reciprocating platen, so that the attachment and the platen will be caused to move across the cutter-face at the proper time while the blank is rotating under the same, which gives the backing off of the thread required.

The apparatus is also designed for the cutting of screw-threads on any rod or blank, as by holding the platen of the milling-machine stationary and turning the crank-shaft $g$, the cam being taken off, the rod or blank will be given a spiral movement, which can be varied by changing the pinions $j$ and $k$, as heretofore described.

My improved apparatus is capable of cutting the threads on taps with great celerity, and when a series of taps is made with great uniformity in the threads cut on all the blanks, which is a great advantage over the machines now generally employed for the purpose, and at the same time it can be readily attached to and used with the ordinary forms of milling-machines in general use.

I do not claim in this application the method of making taps heretofore described, as I intend to file a separate application for the method.

Having now described my invention, what I claim is—

1. In apparatus for cutting screw-taps, the combination, with a rotary cutter having circumferential milling-grooves thereon corresponding to the threads to be formed on the tap, of a slide moving transversely under said rotary cutter and having thereon a spindle and a tail-stock which are adjustable with relation to each other, so as hold the tap-blank sufficiently out of parallel with the cutter to enable it to impart the pitch to the threads formed on the tap, substantially as set forth.

2. In apparatus for cutting screw-taps, the combination, with a rotary cutter having circumferential milling-grooves thereon, of a slide moving longitudinally under said cutter and carrying a rotating spindle and a tail-stock which are adjustable with relation to each other, so as to hold the tap-blank at a slight angle to the cutter to impart the pitch to the thread, and a screw-feed for drawing said slide longitudinally under the cutter, according to the pitch of the thread in presenting a fresh face of the blank to the cutter, substantially as and for the purposes set forth.

3. In apparatus for cutting screw-taps, the combination, with a rotary cutter, of a slide moving transversely under the cutter, a rotating spindle mounted on said slide, and a cam for imparting a transverse movement to the slide during the rotation of the spindle, substantially as and for the purposes set forth.

4. In apparatus for cutting screw-taps, the combination, with a rotary cutter, of the slide $d$, having the spindle $e$, and the plate $n$, adjustable across said slide and carrying the tail-stock $p$, substantially as and for the purposes set forth.

5. In apparatus for cutting screw-taps, the combination, with the cutter, of the base-block $a$, having the nut $d^2$, the slide $d$, moving longitudinally on the base-block and having the screw $d'$ engaging said nut, the spindle $e$ on said slide, and the connecting-gearing between spindle and screw, having a pinion carried on an adjustable arm, $h$, substantially as and for the purpose set forth.

6. In apparatus for cutting screw-taps, the slide $d$, the spindle $e$, having pinion $j$, adjustable arm $h$, mounted on spindle-shaft and carrying pinion $i$, and screw $d'$, carrying pinion $k$, substantially as and for the purposes set forth.

7. In apparatus for cutting screw-taps, the combination, with the cutter, of the slide $d$, moving transversely under the cutter and carrying the rotating spindle $e$, the worm-wheel $f$, secured to said spindle, worm $f'$ on the shaft $g$, meshing therewith, the cam $t$ on the shaft $g$, and arm $u$, engaging with the cam, substantially as and for the purposes set forth.

In testimony whereof I, the said HENRY E. BOYD, have hereunto set my hand.

HENRY E. BOYD.

Witnesses:
WILLIAM A. DUNSHEE,
EDWIN SOLES.